United States Patent [19]

Fryatt

[11] 4,208,059
[45] Jun. 17, 1980

[54] SEALS

[76] Inventor: Leslie A. Fryatt, 20 Talbot Rd., Accrington, Lancashire, England

[21] Appl. No.: 965,301

[22] Filed: Dec. 1, 1978

[30] Foreign Application Priority Data

Dec. 2, 1977 [GB] United Kingdom ............... 50256/77

[51] Int. Cl.² .............................................. F16J 15/32
[52] U.S. Cl. ..................................... 277/153; 277/208
[58] Field of Search ................. 277/152, 153, 208–210, 277/207 R

[56] References Cited

U.S. PATENT DOCUMENTS

| 2,316,713 | 4/1943 | Procter | 277/153 |
| 3,144,256 | 8/1964 | Wright | 277/208 |
| 3,556,539 | 1/1971 | Senigalliesi | 277/209 X |
| 3,727,923 | 4/1973 | McEwen | 277/153 X |
| 3,942,805 | 3/1976 | Sundquist | 277/209 X |
| 3,973,781 | 8/1976 | Arorich | 277/153X |

FOREIGN PATENT DOCUMENTS

| 1213182 | 3/1966 | Fed. Rep. of Germany | 277/153 |
| 368989 | 6/1963 | Switzerland | 277/208 |
| 727814 | 4/1955 | United Kingdom | 277/152 |
| 136136 | 2/1961 | U.S.S.R. | 277/153 |

Primary Examiner—Robert S. Ward, Jr.
Attorney, Agent, or Firm—Fred Philpitt

[57] ABSTRACT

A rotary lip seal comprises an annular member having two sealing lips. An annular space is defined between the two lips and baffle means are arranged to provide a partition across this space.

10 Claims, 1 Drawing Figure

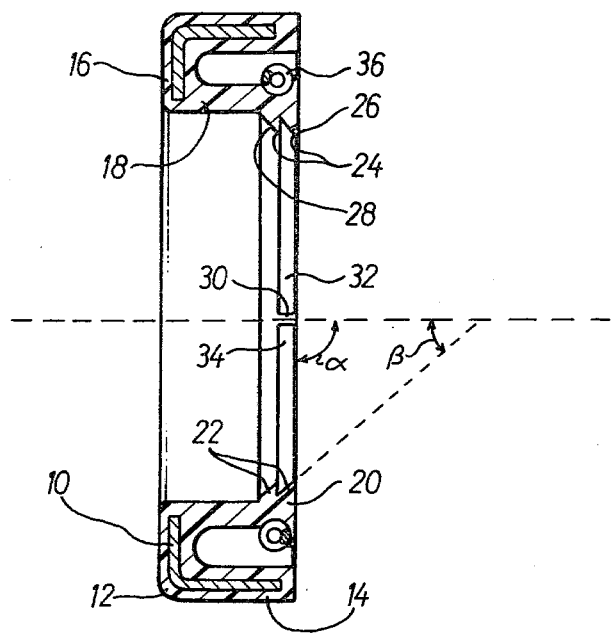

SEALS

DESCRIPTION

This invention concerns seals and more particularly seals of the type known as rotary shaft lip seals.

One particular application of such seals is in a motor vehicle where seals are required to prevent the seepage of oil along the axle shaft. The seal is mounted within a housing about a shaft portion so that the shaft portion rotates within the seal. The axle shaft is, of course, rotatable in either direction and for some while attempts have been made to provide a seal which is capable of preventing leakage of oil along the shaft especially at low angular velocities no matter which way the shaft is rotating. However the results have been less than satisfactory over the range of speeds encountered.

A known rotary shaft lip seal is provided with an annular sealing lip and, at the rear side of the lip, two oppositely directed helical grooves, which serve to feed leaked oil back to and past the sealing lip into the body of oil to be sealed irrespective of the direction of rotation of the shaft about which the seal is mounted. Nonetheless escape of oil at the rear of the seal is still a problem at certain, e.g. low, speeds.

Therefore, it is an aim of this invention to provide a seal with an improved sealing action.

The present invention resides in a rotary shaft lip seal having two annular sealing lips and having baffle means arranged to provide a partition across the annular space between the two lips.

In use, the seal is mounted about a rotary shaft such that the sealing edges contact the shaft and are deflectible towards the front of the seal i.e. towards that side of the seal which faces the fluid to be sealed. Should any fluid leak, during rotation of the shaft, into the space enclosed between the lips and the shaft, this fluid is urged to flow in the direction of rotation of the shaft by fluid friction but meets resistance to such rotational flow in the baffle means so that pressure builds up even at low rotational speeds of the shaft on one side of the baffle means while pressure is reduced on the other side. If the pressure build up is sufficient to overcome the fluid pressure acting on the forward side of the front one of the two lips, then fluid entrained in the space between the lips is expelled forwards into the body of the fluid to be sealed once more. Similarly, any fluid which may leak past both sealing lips exhibits a tendency to be drawn back into the space therebetween as a result of the reduced pressure on the other side of the baffle means.

An advantage, therefore, of the seal is that not only does it act to resist the leakage of fluid therepast but, should any leakage occur, it also tends to draw the leaked fluid back and to return this fluid to the body of the fluid to be sealed.

The sealing lips in a preferred form of the seal have sealing edges which are formed so as to be deflectible in one axial direction but so as to resist deflection in the other axial direction. For example, the lips may have a saw-tooth or buttress-like section wherein the trimming angle of each lip is greater than the lip angle. This allows the lips to be deflected forwards relatively easily in order to take in leaked fluid to the annular space and to return such fluid to the fluid side of the seal, while at the same time giving the lips a greater resistance to deflection towards the back of the seal.

Although a single baffle means is preferred, it will be appreciated that it may be possible to achieve sufficient pressure build up and reduction at, for example, two opposite regions of the annular space for the seal to operate in the desired manner by providing two baffle means. It should be borne in mind, however, that when two baffle means are used, as opposed to one, the pressure increase and reduction at the sides of each baffle means will be less pronounced than is the case with a single baffle means.

Conveniently, the or each baffle means may be in the form of a web moulded between the two lips to provide the or a respective partition across the annular space.

The invention is described further, by way of example, with reference to the accompanying sectional drawing of a rotary shaft lip seal embodying the invention.

The rotary shaft lip seal illustrated in the drawing comprises a rigid annular shell 10 of L-shaped section which is encased within a sealing member 12 as shown to provide support for an outer cylindrical wall 14 and the heel 16 of this member. The member 12 has a sealing element in the form of a flexible inner cylindrical wall 18 whose sealing head 20 is formed with a pair of inwardly directed annular sealing lips 22 which are disposed coaxially and adjacent one another.

These sealing lips 22 have sealing edges 24 which are deflectible towards the front of the seal i.e. the right hand side of the seal as illustrated. In the present embodiment this is achieved by giving the two lips a saw-tooth or buttress-like form so that the trim face 26 of each lip lies generally perpendicular to the axis of the seal while the moulded face 28 is inclined relative to the seal's axis. In other words, the trimming angle $\alpha$ is greater than the lip angle $\beta$. The lip profile ensures that while the lips 22 resist the flow of fluid from the front of the seal to the back thereof, they are nonetheless more easily deflectible to allow the passage of fluid in the reverse direction.

Between the two lips 22 is moulded baffle means in the form of a web 30 which in accordance with the invention serves as a partition separating a region 32 from a region 34 of the annular space between the lips 22.

A garter spring 36 is mounted in a groove in the sealing head 20 in order to load the sealing edges 24 against a rotary shaft, in use.

Operation of the seal is as follows:

In use, the seal is fitted over a rotary shaft (not shown) in order to prevent leakage of fluid along the shaft. The seal is arranged with its front facing the fluid to be sealed, for example oil, and with its heel 16 at an air side of the seal, and the shaft is rotatable relative to the seal.

During rotation of the shaft and indeed when the shaft is stationary, the front one of the two lips acts in the usual fashion to prevent leakage of any fluid therepast. However, should leakage occur when the shaft is rotating, the sealing action in accordance with the invention takes effect to return the leaked fluid to the fluid side of the seal.

Assuming that the shaft is rotating clockwise relative to the seal when viewed from the right in the drawing then any fluid which has leaked into the annular space between the two lips is urged to rotate clockwise with the shaft by fluid friction. However, the fluid encounters the web 30 and is prevented thereby from following the shaft so that pressure builds up in the region 32 of the annular space between the lips. Since the two lips are designed to resist giving way towards the rear of the seal, the portion of the front lip bounding the region 32 tends to be deflected forwards by the increase in pressure, rather than the rear lip being deflected rearwards, and this permits the leaked fluid to return to the front of the seal.

As increase in the pressure in the region 32 is accompanied by a drop in the pressure in the region 34 which creates a suction effect tending to deflect the portion of the rear lip bounding the region 34 forwards and to draw back into the annular space any fluid which may have leaked past both lips.

In effect, therefore, the two lips 22 each act as a one way valve controlled respectively by the pressure differential between the back of the seal and the region of lowered pressure in the annular space, and by the pressure differential between the region of increased pressure in the annular space and the front of the seal.

It will be understood that the sealing action of the described seal takes place irrespective of the direction of rotation of the rotary shaft which the sealing edges of the two lips contact.

Whilst the described seal has sealing lips of asymmetrical section so that the lips are more readily deflectible towards the front of the seal than towards the rear, it should be appreciated that this is not an essential feature of the invention. The sealing lips may instead be of symmetrical section and be deflectible equally readily both towards the front and towards the rear of the seal.

Another possibility is to provide more than two sealing lips, the further lips defining further annular spaces in which additional baffle means are arranged.

I claim:

1. A rotary shaft lip seal adapted to cooperate with a rotary shaft that has a portion of the shaft located in a fluid so as to inhibit fluid flow along the shaft past the shaft region engaged by the seal, said seal comprising
   an annular member having an open central portion surrounding a central axis, said central portion having a diameter approximately equal to the diameter of the rotary shaft around which it is adapted to fit, said annular member having at least two axially spaced apart annular sealing lips extending inwardly from the inner portion of said annular member toward said central axis,
   the innermost portion of said spaced apart sealing lips terminating in axially spaced apart sealing edges that are adapted to contact axially spaced apart portions of the exterior surface of a rotary shaft,
   said spaced apart sealing edges and sealing lips defining an annular chamber between themselves and the shaft surface which the sealing edges are adapted to abut, said annular chamber being adapted to accommodate fluid which leaks between one of the sealing edges and the shaft which that sealing edge is adapted to abut,
   said annular chamber being divided into two equal portions by a baffle means extending fully across adjacent sealing lips at diametrically opposed locations,
   the walls of said annular chamber that are formed by said spaced apart sealing lips being unbroken by inlets for the introduction of fluids,
   whereby when fluid leaks past the sealing edge which is closest to a source of fluid and enters said annular chamber, said baffle means will act to interrupt fluid circulation caused by shaft rotation and thereby create between said annular chamber and the environment external thereto, a fluid pressure differential effective to force said fluid back under the sealing edge that it originally leaked past.

2. A lip seal according to claim 1 wherein said sealing lips and sealing edges are formed so as to be deflectible in one axial direction of said annular member and so as to resist deflection in the other axial direction of said member.

3. A lip seal according to claim 2 wherein said sealing lips have a saw-tooth cross section.

4. A lip seal according to claim 2 wherein each of said sealing lips has two faces defining with said axis a trimming angle and a lip angle, and wherein said trimming angle of each of said lips is greater than said lip angle.

5. A lip seal according to any one of claims 1, 2, 3 or 4 wherein said baffle means comprises a web moulded between said lips.

6. In a rotary shaft lip seal for cooperating with a shaft having a portion located in a lubricant body to inhibit lubricant flow along the shaft past the shaft region engaged by the seal, said seal having at least two shaft-engaging annular sealing lips projecting radially inwards from the inner periphery of said body member, the improvement wherein said annular sealing lips are axially spaced to define between them an annular chamber for receiving lubricant leaking past said lips along said shaft, and baffle means extending between said lips to provide a partition across said annular chamber acting to interrupt lubricant circulation set up therein by shaft rotation and thereby to create between said chamber and the environment external thereto, a fluid pressure differential effective to return said lubricant from said chamber to said lubricant body.

7. A lip seal according to claim 6 wherein said sealing lips and sealing edges are formed so as to be deflectible in one axial direction of said annular member and so as to resist deflection in the other axial direction of said member.

8. A lip seal according to claim 6 wherein said lips have a saw-tooth section.

9. A lip seal according to claim 6 wherein each of said lips has two faces defining with said axis a trimming angle and a lip angle, and wherein said trimming angle of each of said lips is greater than said lip angle.

10. A lip seal according to any one of claims 6, 7, 8 or 9 wherein said baffle means comprises a web moulded between said lips.

* * * * *